Figure 5:
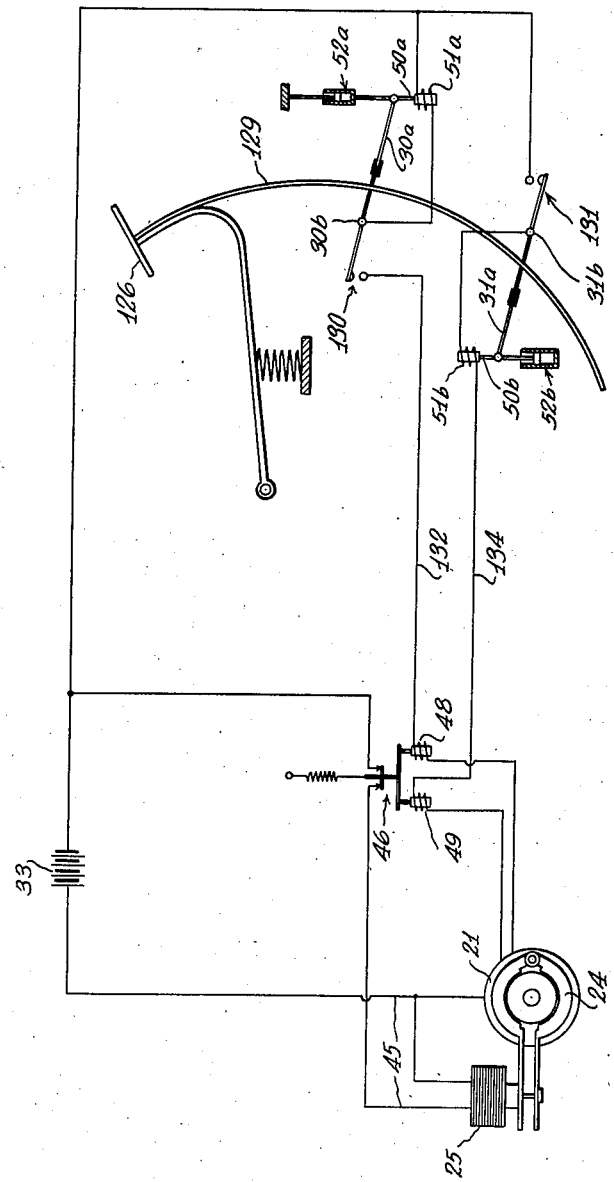

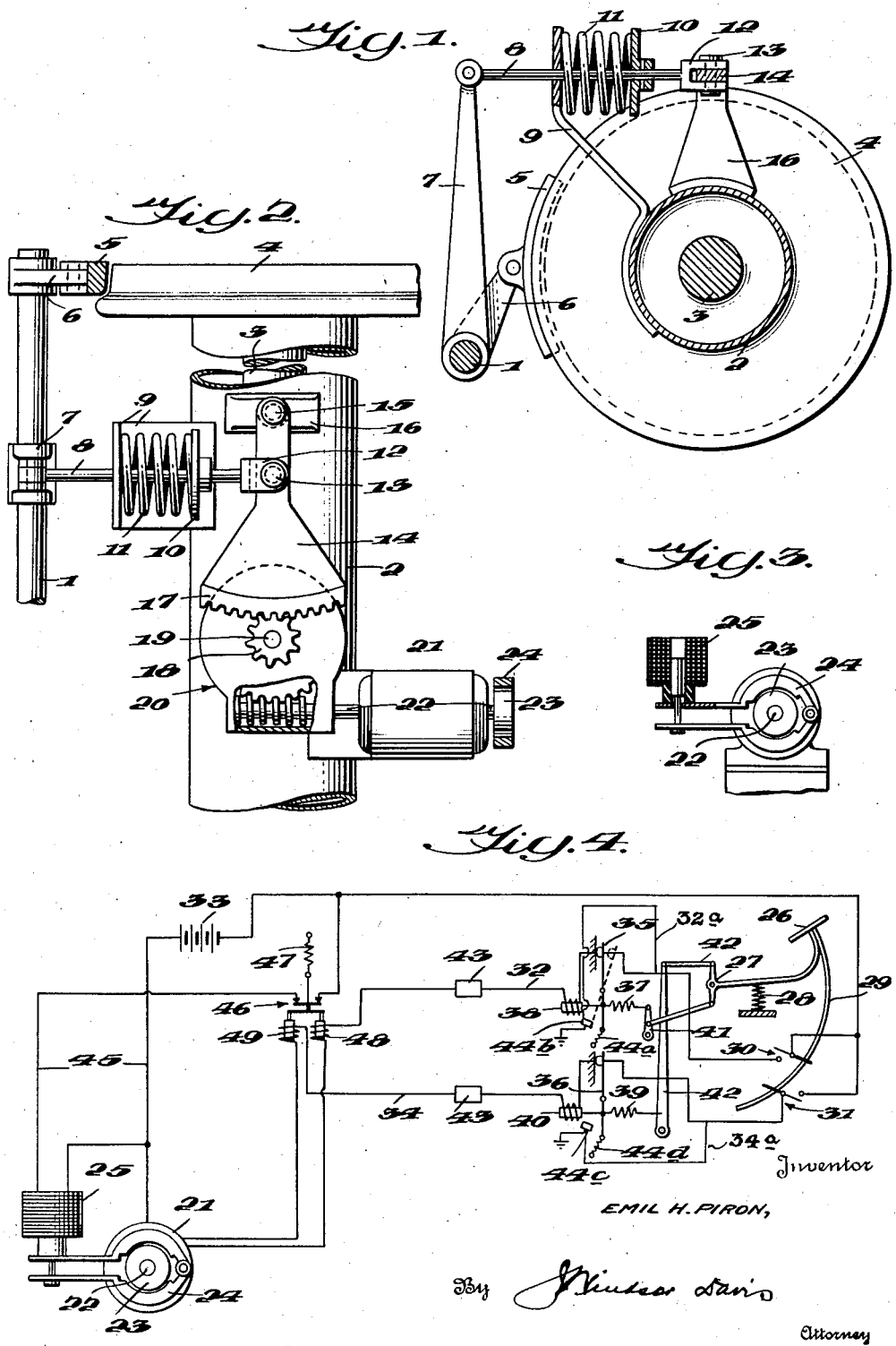

Patented June 6, 1944

2,350,636

UNITED STATES PATENT OFFICE 2,350,636

ELECTRIC BRAKING SYSTEM

Emil H. Piron, New York, N. Y., assignor to Transit Research Corporation, New York, N. Y., a corporation of New York Application October 15, 1942, Serial No. 462,160

7 Claims. (Cl. 188—173)

This invention relates to braking systems for vehicles, such as street cars, and has for its object to provide an electrically actuated braking means in combination with a manual controlling means capable of varying the braking pressures to obtain any desired value of deceleration of a vehicle in a smooth manner and completely at the will of the driver.

Another object is to provide a spring applied brake in combination with electrical means capable of supplementing the pressures of the springs on the brake shoes, the electrical means constituting the means for retracting the shoes after a brake application.

A further object is to provide electrically retractable spring applied brakes so arranged that the usual manual brake may be dispensed with without sacrifice of the customary precaution for safety of the passengers and vehicle.

I am aware that electrically retractable spring applied brakes are old. The usual procedure is to employ a preloaded spring to perform the brake application and the action of a solenoid or motor to overcome the pressure of the spring and release the brake shoes afterwards. In such systems the spring must be sufficiently powerful to make a full brake application and the solenoid, or motor, must be sufficiently powerful to overcome the spring and fully release the brakes. One drawback to known systems of the type is that large, cumbersome and expensive equipment is necessary due to the fact that the spring acts alone to perform the application and that the motor acts alone to perform the release. Another drawback is that they produce either full brake application or full brake release, a condition which is acceptable in case of elevators or other pieces of machinery when the location of the stop is known in advance or is arbitrary, but which is not acceptable in case of moving vehicles, when the choice of the location of the stop must be left to the judgment of the driver and, therefore, requires braking action which can be regulated at will by the driver.

It is because of the fulfillment of this last condition that air brakes and hydraulic brakes have been much more popular for vehicles. But such brakes require pumping units, accumulators, valves, piping and complications which increase their first cost, weight and cost of maintenance and it is the purpose of this invention to replace them by a cheaper and lighter electric system, easier to maintain in service, but with all the advantages of safety and easy regulation of the driver controls found in air and hydraulic systems.

In order to avoid the drawbacks of previous electrical systems, it is herein proposed to employ the principle of storing energy in springs which, upon release, exert, say, forty-five percent of the entire braking pressure of which the system is designed. I then provide electrically actuated means capable of adding a substantial force through the remaining distance through which the brake shoes must act in order to obtain the remaining fifty-five percent of maximum braking pressure. Due to the help of the springs it becomes practically feasible to employ a small, low voltage motor connected to one or more brake shoes through a speed reducing device.

A further object is to provide circuit breakers entailing spring means capable of automatically setting themselves each time the brakes are called upon to function, one of said circuit breakers functioning to interrupt the source of power when the desired degree of release is obtained.

Still a further object is to energize a secondary circuit and secondary braking device, acting on the brake applying motor and maintain the desired application or release pressure as soon as such is obtained, by immobilizing the motor, such secondary braking being released upon demand for another application or release pressure.

An object of the invention incidental to the foregoing is to provide an electrical braking system which requires such a small amount of current that storage batteries may be relied upon therefor.

Figure 6:
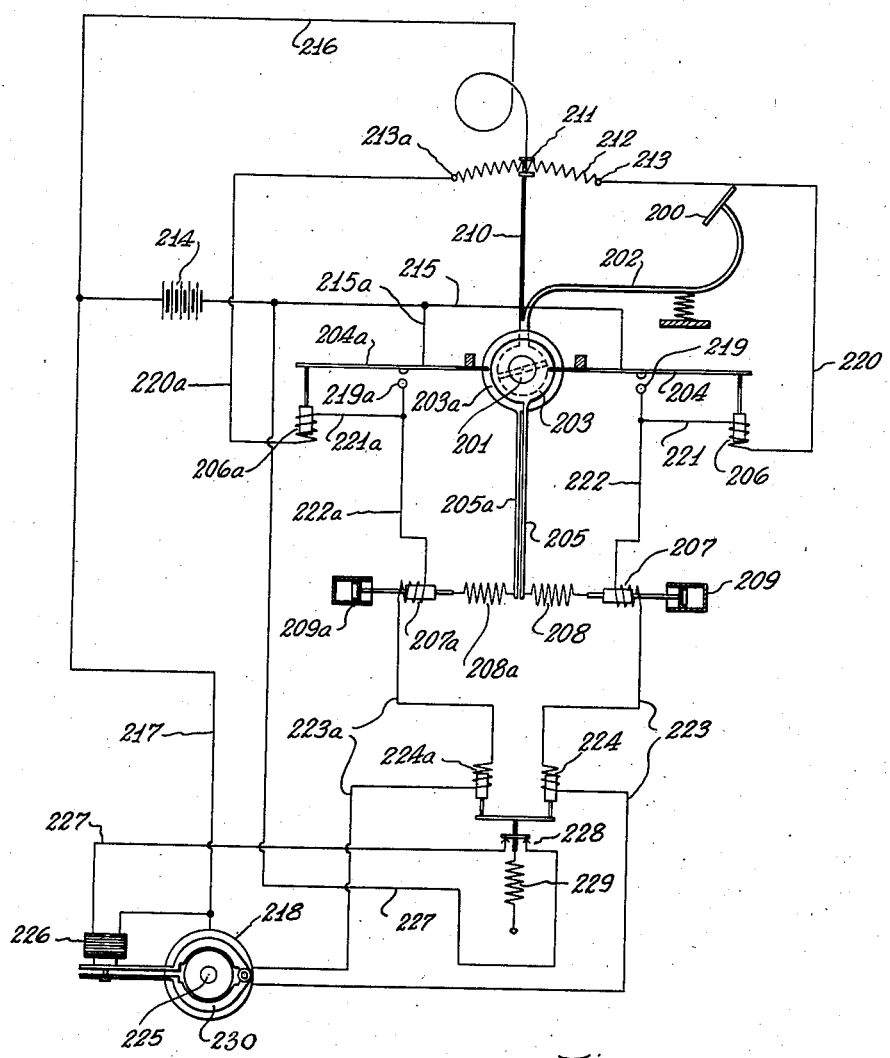

Other objects and advantages will become more fully apparent as reference is had to the accompanying drawings wherein my invention is illustrated, and in which Figs. 1, 2 and 3 are schematic views of the brake mechanism, Fig. 4 is a diagram of the electrical circuit, Fig. 5 is a diagram of an alternate switch and circuit breaker combination, and Fig. 6 is a diagram of another alternate system.

More specifically, I designates a rotatable brake shaft and 2 an axle housing encircling an axle 3 upon which a pair of rail wheels 4 are mounted, one of the wheels being shown in the drawings. A brake shoe 5 is supported by an arm 6, which is fixed to the brake shaft I, for contact with the wheel 4. It will be understood, of course, that a brake shoe 5 is provided for contact with each of the two wheels on the axle 3. The shoes are caused to contact the wheels by a slight rotative movement of the shaft I in one direction and are retracted from contact with the wheels by a slight rotative movement in the reverse direction.

Fixed to the brake shaft 1 is a lever 7 having a rod 8 pivotally connected to the free end thereof and extending through an opening in a bracket 9 supported by the axle housing 2. On the rod 8 is fixed a plate 10 and a spring 11 is interposed between the bracket and plate in such a manner that it tends to swing the lever 7 and rotate the shaft 1 in a direction to apply the brakes. The spring 11 is pre-compressed and is capable of exerting a brake applying force equal to 45% of the total braking force necessary for full brake application, or, in other words, a brake application almost equal to one-half the maximum possible application.

The rod 8 terminates in a fork 12 which is pivotally connected at 13 to a horizontal lever 14. The lever 14 is pivotally mounted at 15 on a bracket 16 secured to the axle housing 2, to swing about a vertical axis. As may be better seen in Fig. 2, the lever 14 has a gear formation 17 on its free end which meshes with a pinion gear 18 mounted on the slow speed shaft 19 of a speed reducer 20. The speed reducer 20 is mounted on the axle housing 2 and has an electric motor 21 connected to its high speed shaft 22. The speed reducing gearing and lever 14 constitute a convenient means for transforming the high speed low torque of the motor 21 to a slow, powerful motion of the rod 8. It will be understood that this particular means is shown by way of example only, and that any equivalent speed reducing means may be employed for this purpose.

Connected to the motor shaft 22 is a brake drum 23. A brake mechanism 24, shown more clearly in Fig. 3, is adapted to be rendered operative to oppose rotation of the motor shaft 22 by energization of a solenoid 25.

The control system, shown in Fig. 4, includes a brake lever or pedal 26, pivoted at 27 to swing about a horizontal axis, and yieldingly held in its upper position by a spring 28. The brake lever or pedal 26 is provided with a curved arm 29 which frictionally actuates a pair of switches 30 and 31 in such manner that any slight downward motion of the arm 29 opens the switch 30 and closes the switch 31 and a slight upward movement will produce the opposite result.

When the brake lever or pedal 26 is moved upwardly closing of the switch 30 energizes a circuit 32, which includes a battery 33 and the motor 21, and causes operation of the motor 21 in the proper direction to release the brakes. In the other case, when the lever or pedal 26 is moved downwardly closing of the switch 31 energizes a circuit 34 which also includes the battery 33 and the motor 21 and causes operation of the motor 21 in a direction to apply the brakes.

The circuits 32 and 34 include automatic circuit breakers 35 and 36, respectively, which open their respective circuits when the current therein reaches a certain value determined by the position of the brake pedal. These circuit breakers are of the conventional type, and consist of a switch which is maintained closed by the action of a spring. The current passing through the switch, or part of it, passes also through a solenoid which is part of the circuit breaker, and which is so disposed that it opens the switch when the current creates a magnetic pull in the solenoid sufficient to overcome the pull of the spring. The spring for closing the circuit breaker 35 is designated 37 and the solenoid 38, and for the circuit breaker 36 the corresponding elements are designated 39 and 40 respectively.

The pressure of the spring 37 of the circuit breaker 35 is regulated through a linkage 41 connected to the lever or pedal 29 in such manner that the circuit breaker 35 opens the circuit 32 when the current is near its minimum value if the lever or pedal 29 is near its down position. This is accomplished by lessening the tension on the spring 37 as the lever or pedal moves downwardly. The reverse takes place when the lever or pedal 26 is near its upper position, which causes the tension of the spring 37 to be increased so that the circuit breaker opens when the current is near its maximum value. In intermediate positions the circuit breaker opens at current values between the maximum and minimum values according to the position of the lever or pedal and the tension of the spring caused thereby.

The function of the circuit breaker 36 is the reverse of the circuit breaker 35. Its spring 39 is connected to the lever or pedal 26 by a linkage 42 which so varies the spring pressure according to the direction of movement of the pedal or lever 29 that the circuit breaker 36 opens when the current is maximum if the lever or pedal 29 is near its down position or when the current is near minimum if the lever or pedal is in or near its up position, or when the current is intermediate in value if the lever or pedal 29 is in intermediate positions.

Diagrammatically indicated at 43 in the circuits 32 and 34 are current damping means such, for example, as inductive lags which are so arranged that the circuit breakers 35 and 36 are not operated during the first surge of current obtained when their respective switches 30 or 31 are closed. The damping means is preferably arranged so that action of the circuit breakers starts a fraction of a second after closing of respective switches when the current has reached a minimum value due to the motor 21 having reached its maximum speed. After having reached this maximum the motor speed from then on starts to decrease, due to the increasing torque imposed on the motor by the reaction of the brake shoe 5 when the brakes are applied, or by the spring 11 when the brakes are released, and the current increases and the respective circuit breaker 35 or 36 opens when the current reaches a value determined by the position of the lever or pedal 29.

The circuit breakers when once opened are held open by suitable latches which can be operated either electrically or mechanically. The latches are so arranged that they permit automatic re-setting of their respective circuit breakers for another operation every time their corresponding switch 30 or 31 is closed. A suitable electrical latching arrangement is illustrated in which the switch lever 35 (or 36) is shown closed in full lines in order to close the circuit 32 (or 34) at that point. When a motion of the foot pedal 26 causes the switch 30 (or 31) to close, current then flows through the circuit 32 (or 34). The first surge of current is regulated by the inductance 43, the motor 21 is caused to rotate in one direction or the other and the current increases as the resistance against the motion of the motor increases. When the current becomes sufficient to cause the pull of the solenoid 38 (or 40) to overcome the pull of the spring 37 (or 39) and the toggle action of spring 44a, the switch 35 (or 36) opens into the dotted position, thus breaking the flow of current in circuit 32 (or 34).

However, an auxiliary circuit 32a (or 34a) directs current through a holding magnet 44b (or 44c) which keeps the switch 35 (or 36) open against the action of spring 37 (or 39) as long as the switch 30 (or 31) remains closed provided the pedal remains in the position it has been placed in. In addition to this an amount of electric resistance is placed in this circuit 32a (or 34a) by the motion of the pedal, such that if the pedal is now moved further, the increased tension of spring 37 (or 39) overcomes the action of the holding magnet 44b (or 44c) and closes the switch 35 (or 36) again until a new adjustment of the brakes has taken place. If, on the contrary, the brake pedal is moved in the opposite direction, the switch 31 (or 30) which was closed is now opened, the action of the holding magnet 44c (or 44b) closes and the switch 36 (or 35) closes, while the switch 31 (or 30) which was open is now closed and another adjustment of the brakes is made in the same manner as above described.

The system thus far described is only capable of applying or releasing the brakes, by selectively causing operation of the motor 21 in reverse directions, and is incapable of holding the brakes in either their applied or retracted position when respective circuit breakers 36 and 35 are opened. In order to hold the brakes in their retracted or applied positions a circuit 45 including the battery 33 is provided for operating the solenoid 25 which applied the motor brake 24. In the circuit 45 is a switch 46 which is normally held closed by a spring 47. The switch 46 is adapted to be opened by a solenoid 48 in the circuit 32 or by a solenoid 49 in the circuit 34. When either circuit 32 or 34 is energized its respective solenoid 48 or 49 opens the switch 46 so that the motor brake 24 is released and when both circuits 32 and 34 are de-energized the switch 46 closes and causes the motor brake to be applied.

Although the previous description covers a complete system, an alternative is given here, as shown in Fig. 5, to disclose a scheme by which switches 30 and 31 can be combined with their respective circuit breakers 35 and 36 to accomplish the same function in a very simple manner. In this alternate arrangement the ends of the levers of switch 130 and 131, which correspond to the above described switches 30 and 31, are in frictional contact with a curved arm 129 on a brake pedal 126, and are prolonged by spring blades 30a and 31a respectively. The curved arm 129 is so shaped that it contacts the switch 130 at a point far from its pivotal point 30b when the pedal 126 is moved completely down. The contacting points approach nearer the pivotal point 30b when the pedal 126 is moved completely up and are at points progressively further from 30b as pedal 126 moves from a down to an up position so that the torque exercised on the swinging arm of the switch by the constant friction increases as pedal 126 nears its up position.

The curved arm 129 is also shaped so that a reverse condition exists with respect to the switch 131, i. e. that the frictional torque is maximum where pedal 126 is down and minimum when it is up.

The free end of spring blade 30a is articulately connected to a vertical shaft 50a, one end of which comprises a pole piece for coaction with a solenoid 51a, and the other end of which constitutes a part of a dash pot 52a. In the same manner, the free end of the spring blade 31a is articulately connected to a vertical shaft 50b which has a pole piece engaging in solenoid 51b and the other end comprising a part of a dash pot 52b.

The solenoid 51a is mounted in series with the switch 130 in the circuit 132 and the solenoid 51b is mounted in series with the switch 131 in the circuit 134. The circuits 132 and 134 correspond to the above described circuits 32 and 34 respectively. In operation, when the pedal 126 is moved upwardly it opens switch 131, if it is closed, and closes switch 130. The current in circuit 132 energizes solenoid 51a, pulls shaft 50a downwards against the resistance of dash pot 52a and bends the spring blade 30a until the bending develops a force sufficient to open the switch 130 against the friction of its lever against the curved arm 129, which friction, in turn, depends on the position of the pedal 126.

In reverse, when pedal 126 is moved downwardly, it opens the switch 130, if it is closed, and closes the switch 131. Then the current in the solenoid 51b pulls the shaft 50b upwardly against the resistance of the dash pot 52b and bends the spring blade 31a until the force developed by that bending becomes sufficient to open the switch 131 against the friction of its lever with the curved arm 129 which, in turn, increases as the position of pedal 126 approaches the lowest limit of its stroke.

This arrangement replaces the parts 35, 36, 37, 38, 39, 40, 41, 42 and 44 previously described by the parts 31a, 31b, 50a, 50b, 51a, 51b, 52a and 52b, but the other parts remain the same and are, therefore designated by use of the same reference characters as used above in order that the above description may be used with reference thereto.

The solenoids 51a and 51b may, if desired, be placed in derivation instead of in series in the circuits 132 and 134, and a large number of variations of these arrangements can be used to accomplish the same purpose.

The first described embodiment constitutes an example of a control system using switches which are moved to a closed position by friction and supplemented by circuit breakers. In the second embodiment described above the switches are also moved to their closed position by friction and are opened by electromagnets. A third example is described hereinafter wherein switches are used which are moved to a closed position by friction and maintained closed by electromagnets. The closing forces exerted by these magnets is regulated by a current whose intensity is dependent upon the position of the brake pedal. The switches are opened by counteracting electromagnets which are regulated as to their switch opening forces by the current of the brake actuating motor.

Referring to Fig. 6, 200 designates a brake pedal mounted upon a horizontal shaft 201 by means of a lever 202. Two sleeves 203 and 203a are mounted upon the shaft 201, in side by side relation, in such manner that the friction between the shaft and the discs is sufficient that in the absence of extrinsic forces the discs will rotate with the shaft. In the presence of extrinsic forces opposing rotation of the discs, however, relative rotation may take place between the shaft and the discs.

Mounted upon the sleeve 203 is a switch arm 204 and a lever 205, and a similar switch arm 204a and lever 205a are mounted upon the sleeve 203a. A solenoid 206 is connected to the free end of the switch arm 204 and a solenoid 207 is connected to the lever 205 by a spring 208 with the two solenoids 206 and 207 being so arranged that when energized they tend to move the switch arm 204 in opposite directions. Similarly, a solenoid 206a is connected to the switch arm 204a and a solenoid 207a is connected to the lever 205a by a spring 208a. A dash pot 209 is connected to the solenoid 207 and a dash pot 209a is connected to the solenoid 207a. The dash pots 209 and 209a are so constructed that they act to retard movement of the solenoids only in the direction they move when energized.

Mounted rigidly on the shaft 201 for movement with the brake pedal 200 is an arm 210 carrying a contact 213 which moves along an electric resistance 212 having terminals 213 and 213a in such manner that the resistance from 211 to 212 is small when the brake pedal 200 is in a low position and large when it is in a high position, and in such manner that the resistance from 211 to 213a is small when the brake pedal is in its high position and high when the pedal is in its low position.

A battery 214 has one side connected by lead wires 215 and 215a to the switch arms 204 and 204a, respectively, and its other side connected by a lead wire 216 to the contact 211 and by a lead wire 217 to the motor 218. The motor 218 corresponds to the motor 21 shown in Fig. 1 for applying and retracting the brake. Adjacent the switch arms 204 and 204a are contacts 219 and 219a respectively.

The resistance terminal 213 is connected by the lead wire 220 to the solenoid 206 which is also connected by the lead wire 221 to a lead wire 222 which connects the switch contact 219 to the solenoid 207. The solenoid 207 is connected by a lead wire 223, in which a solenoid 224 is connected, to the motor 218. The resistance terminal 213a is connected by the lead wire 220a to the solenoid 206a which is also connected by a lead wire 221a to a lead wire 222a extending from the switch contact 219a to the solenoid 207a. A lead wire 223a, having a solenoid 224a connected therein, extends from the solenoid 207a to the motor 218.

The function of the brake control above described is to cause the motor 218 to turn in a direction to apply the brake every time the pedal 200 is moved from any position to any other position in a downward direction and to cause the same motor to turn in an opposite direction, that of brake release, every time the same pedal is moved in an upward direction from any position to another position. A further function of the control circuit is to stop the motor after it has been caused to turn in either direction when the torque or current in the motor reaches a value which is predetermined by the position of the brake pedal at that time. These functions are obtained through the above described circuits in the following manner.

Assuming that the pedal 200 is moved downwardly by manual pressure, the sleeve 203 is caused to rotate with the shaft 201 and the switch arm 204 is moved into engagement with the contact 219. As this motion of the switch arm 204 takes place the sleeve 203 likewise causes the lever 205 and spring 208 to move the pole piece of the solenoid 207 and the piston of the dash pot 209. The dash pot piston is so arranged that resistance to this movement is negligible. Upon closing of the switch 204, 219 a circuit is closed which may be traced from the battery 214 through the wire 216, the portion of the resistance 212 between the contact 211 and the terminal 213, the wire 220 to the solenoid 206, the wires 221, 222 and 215 to the battery. A second circuit may be traced from the contact 219 through the wire 222, solenoid 207 and wire 223 to the motor 218, and from the motor through the wire 217 to the battery.

The result is that the solenoid 206 is energized by a current regulated by the size of the portion of the resistance 212 between the contact 211 and the terminal 213, and it acts to hold the switch 204, 219 closed. The solenoid 207 is energized by the current going to the motor 218 and tends to open the switch 204, 219 by pulling on the lever 205 through the spring 208. However, the solenoid 207 can not immediately cause opening of the switch because movement in the direction necessary to accomplish this is opposed by the dash pot 209 and it requires a short length of time for the solenoid 207 to push back the piston of the dash pot and build up sufficient tension in the spring 208 to cause such movement in opposition to the action of the solenoid 206. By the time actual movement of the switch arm 204 takes place the first surge of current on the stalled motor is over, the motor will have reached a top speed and will be slowing down as a result of the increasing opposing torque due to the braking forces developed. Under these conditions, when the motor current passing through the solenoid 207 becomes sufficient to cause the solenoid 207 to overpower the solenoid 206 the switch arm 204 breaks away from the contact 219. The motor is thus rendered inoperative and is braked as hereinafter described.

The circuit for causing operation of the motor 218 in a direction to retract the brake is identical to the above described for applying the brakes, except that it operates upon movement of the pedal 200 in an upward direction. Briefly described, as soon as contact is established between the switch arm 204a and the contact 219a by an upward movement of the pedal 200 the current rushes through the portion of the resistance 212 between the contact 211 and the terminal 213a to the solenoid 206a. The motor current likewise rushes through the solenoid 207a to the motor, but the action of the solenoid 207a is delayed by the dash pot 209a. When the motor current, after the first surge is over, develops to a point where the pressure exerted by the solenoid 207a overpowers the solenoid 206a, the switch 204a, 219a is again opened.

From the foregoing it becomes apparent that the solenoids 206 and 207 are balanced one against the other, as also is the case with the solenoids 206a and 207a. As the current value in the solenoid 206, as well as in 206a, depends on the position of the brake pedal, and as the current value in the solenoid 207 (or 207a) depends on the counter torque developed by the reaction of the brakes, it becomes evident that the reaction of the brakes is measured by the position of the brake pedal. Further, it is evident also that when the switch parts 204 and 219 (or 204a and 219a) are separated, the solenoids 206 and 207 (or 206a and 219a) are de-energized, spring 208 (or 208a) restores the dash pot 209 (or 209a) to its original position and the system is set for a new operation. The new operation will be caused by a new motion of the brake pedal, whether it be a more intensive application due to a further downward motion of the pedal or a total or partial release motion due to a complete or partial upward motion of the pedal.

Like the first described embodiments of the invention this system likewise includes a brake 230 for the shaft 225 of the motor 218 which actuates the brakes. This brake 230 is adapted to be applied by a solenoid 226 in a circuit 227 including the battery 214 and a switch 228 which is normally held closed by a spring 229. The solenoids 224 and 224a are both connected to the switch 228 to open the same whenever the motor 218 is energized.

Although specific embodiments of the invention have been illustrated and described, it will be understood that various changes may be made within the scope of the appended claims without departing from the spirit of the invention, and such changes are contemplated.

What I claim is:

1. In a braking system, a brake, a spring having energy stored therein for application of said brake, electrical means comprising a motor and a speed reduction device connected to the shaft of said motor, means connecting the low speed side of said device to said brake, a brake pedal, a circuit including means operated by movement of said pedal in one direction for energizing said motor in a direction to retract the brake, automatic means de-energizing said motor when the current in said circuit reaches a value determined by the extent of movement of the pedal, a circuit including means operated by movement of said pedal in a reverse direction for energizing said motor in a direction to apply the brake, means for automatically de-energizing said motor when the current in said second circuit reaches a value determined by the extent of reverse movement of the pedal, means for preventing rotation of said motor shaft, and means operated by energization of either the first or second circuits for rendering said rotation preventing means inoperative.

2. In a braking system, a brake, a spring having energy stored therein for application of said brake, electrical means comprising a motor and a speed reduction device connected to the shaft of said motor, means connecting the low speed side of said device to said brake, a brake pedal, a circuit including means operated by movement of said pedal in one direction for energizing said motor in a direction to retract the brake, automatic means de-energizing said motor when the current in said circuit reaches a value determined by the extent of movement of the pedal, a circuit including means operated by movement of said pedal in a reverse direction for energizing said motor in a direction to apply the brake, means for automatically de-energizing said motor when the current in said second circuit reaches a valve determined by the extent of reverse movement of the pedal, a solenoid actuated brake for said motor shaft, a supply circuit for said solenoid, a switch in said last named supply circuit having yielding means normally holding it closed, and a solenoid in each of the first and second circuits for opening said last named switch upon energization of either the first or second circuit.

3. In a braking system, a brake, a reversible electric motor operatively connected to said brake, an electric circuit connected to said motor for operating the motor to retract the brake, a second electric circuit for operating the motor to apply the brake, a control pedal, means operated by said control pedal for closing the first circuit incident to movement of the pedal in an upward direction and for closing the second circuit incident to movement in a downward direction, means for automatically opening the first and second circuits respectively when the current therein reaches a value which may be predetermined, and means operated by said brake pedal for determining the current value at which said circuits are opened, said last named means regulating the breaking current value in such manner that the first circuit is opened at a current value that progressively increases from a minimum to a maximum as the pedal is progressively moved upwardly and the current value of the second circuit progressively increases from a minimum to a maximum as said pedal is progressively moved downwardly.

4. In a braking system, a brake shoe, a brake linkage connected to and adapted to apply and retract the brake shoe, a reversible electric motor connected to said linkage, electric circuits for operating said motor in reverse directions, the first of said circuits including a control switch and a circuit breaker responsive to current in the first circuit, a brake pedal, means operated by said brake pedal for closing said control switch incident to upward movement of said pedal and for opening it incident to downward movement, means operated by said brake pedal for regulating said circuit breaker in such manner that the current value at which it opens progressively increases proportionately and incident to upward movement of said brake pedal, the second of said circuits including a control switch and a circuit breaker responsive to current in the second circuit, means operated by said brake pedal for closing the second control switch incident to downward movement of said pedal and for opening it incident to upward movement, and means operated by said brake pedal for regulating the second circuit breaker in such manner that the current value at which it operates progressively increases proportionately and incident to downward movement of the brake pedal.

5. In a braking system, a brake shoe, a brake linkage connected to and adapted to apply and retract the brake shoe, a reversible electric motor connected to said linkage, electric circuits for operating said motor in reverse directions, the first of said circuits including a control switch and a circuit breaker responsive to current in the first circuit, a brake pedal, means operated by said brake pedal for closing said control switch incident to upward movement of said pedal and for opening it incident to downward movement, means operated by said brake pedal for regulating said circuit breaker in such manner that the current value at which it opens progressively increases proportionately and incident to upward movement of said brake pedal, the second of said circuits including a control switch and a circuit breaker responsive to current in the second circuit, means operated by said brake pedal for closing the second control switch incident to downward movement of said pedal and for opening it incident to upward movement, means operated by said brake pedal for regulating the second circuit breaker in such manner that the current value at which it operates progressively increases proportionately and incident to downward movement of the brake pedal, and means automatically rendered operative by de-energization of said motor for braking the motor shaft to prevent rotation thereof.

6. In a braking system, a brake shoe, a brake linkage connected to and adapted to apply and retract the brake shoe, a reversible electric motor connected to said linkage, electric circuits for operating said motor in reverse directions, the first of said circuits including a control switch and a circuit breaker responsive to current in the first circuit, a brake pedal, means operated by said brake pedal for closing said control switch incident to upward movement of said pedal and for opening it incident to downward movement, means operated by said brake pedal for regulating said circuit breaker in such manner that the current value at which it opens progressively increases proportionately and incident to upward movement of said brake pedal, the second of said circuits including a control switch and a circuit breaker responsive to current in the second circuit, means operated by said brake pedal for closing the second control switch incident to downward movement of said pedal and for opening it incident to upward movement, means operated by said brake pedal for regulating the second circuit breaker in such manner that the current value at which it operates progressively increases proportionately and incident to downward movement of the brake pedal, means for preventing rotation of said motor shaft, and means operated by energization of either the first or second circuits for rendering said rotation preventing means inoperative.

7. In a braking system, a brake shoe, a brake linkage connected to and adapted to apply and retract the brake shoe, a reversible electric motor connected to said linkage, electric circuits for operating said motor in reverse directions, the first of said circuits including a control switch and a circuit breaker responsive to current in the first circuit, a brake pedal, means operated by said brake pedal for closing said control switch incident to upward movement of said pedal and for opening it incident to downward movement, means operated by said brake pedal for regulating said circuit breaker in such manner that the current value at which it opens progressively increases proportionately and incident to upward movement of said brake pedal, the second of said circuits including a control switch and a circuit breaker responsive to current in the second circuit, means operated by said brake pedal for closing the second control switch incident to downward movement of said pedal and for opening it incident to upward movement, means operated by said brake pedal for regulating the second circuit breaker in such manner that the current value at which it operates progressively increases proportionately and incident to downward movement of the brake pedal, a solenoid actuated brake for said motor shaft, a supply circuit for said solenoid, a switch in said last named supply circuit having yielding means normally holding it closed, and a solenoid in each of the first and second circuits for opening said last named switch upon energization of either the first or second circuit.

EMIL H. PIRON.